US008249782B2

(12) United States Patent  
Miglioranza

(10) Patent No.: US 8,249,782 B2
(45) Date of Patent: Aug. 21, 2012

(54) METHOD FOR ELECTRONICALLY CONTROLLING A BICYCLE GEARSHIFT AND ELECTRONIC SYSTEM FOR A BICYCLE

(75) Inventor: Federico Miglioranza, Schio (IT)

(73) Assignee: Campagnolo S.r.l., Vicenza (IT)

(*) Notice: Subject to any disclaimer, the term of this patent is extended or adjusted under 35 U.S.C. 154(b) by 696 days.

(21) Appl. No.: 12/366,364

(22) Filed: Feb. 5, 2009

(65) Prior Publication Data

US 2009/0204299 A1 Aug. 13, 2009

(30) Foreign Application Priority Data

Feb. 6, 2008 (EP) .................................... 08425069

(51) Int. Cl.
*G06F 7/00* (2006.01)
(52) U.S. Cl. ............... 701/51; 701/55; 701/64; 475/176
(58) Field of Classification Search .................... 701/51, 701/52, 55, 64; 475/49, 149, 176
See application file for complete search history.

(56) References Cited

U.S. PATENT DOCUMENTS

| | | | |
|---|---|---|---|
| 4,490,127 A | 12/1984 | Matsumoto et al. |
| 4,938,733 A | 7/1990 | Patterson |
| 4,976,435 A | 12/1990 | Shatford et al. |
| 5,213,005 A | 5/1993 | Nagano |
| 5,213,548 A | 5/1993 | Colbert et al. |
| 5,261,858 A | 11/1993 | Browning |
| 5,357,177 A | 10/1994 | Fey et al. |
| 5,470,277 A | 11/1995 | Romano |
| 5,480,356 A | 1/1996 | Campagnolo |
| 5,494,307 A | 2/1996 | Anderson |
| 5,577,969 A | 11/1996 | Watarai |
| 5,599,244 A | 2/1997 | Ethington |
| 5,681,234 A | 10/1997 | Ethington |
| 5,728,017 A | 3/1998 | Bellio et al. |
| 5,787,757 A | 8/1998 | Ozaki |
| 5,865,454 A | 2/1999 | Campagnolo |
| 6,047,230 A | 4/2000 | Spencer et al. |
| 6,146,297 A | 11/2000 | Kimura |
| 6,367,833 B1 | 4/2002 | Horiuchi |
| 6,467,786 B2 | 10/2002 | Horiuchi |

(Continued)

FOREIGN PATENT DOCUMENTS

DE   039 38 454   11/1989

(Continued)

OTHER PUBLICATIONS

European Search Report, Application No. 08005437.2, dated May 4, 2009.

(Continued)

*Primary Examiner* — Gertrude Arthur Jeanglaude
(74) *Attorney, Agent, or Firm* — Volpe and Koenig, P.C.

(57) ABSTRACT

A method for electronically controlling a bicycle gearshift and a bicycle electronic system perform gearshifting. To perform this gearshifting, a displacement of an actuator from a current position (P) to a position (P1, PN) of engagement of a chain on an extreme toothed wheel of a gearshift group is started (203,205), a destination toothed wheel (PT) of the gearshift group is subsequently preselected (208), and the displacement is subsequently stopped (210) when the actuator is in a position (PT) of engagement of the chain on the destination toothed wheel (PT) of the gearshift group.

32 Claims, 9 Drawing Sheets

U.S. PATENT DOCUMENTS

| | | |
|---|---|---|
| 6,634,971 B2 | 10/2003 | Campagnolo |
| 6,679,797 B2 | 1/2004 | Valle |
| 6,757,567 B2 | 6/2004 | Campagnolo |
| 6,866,279 B2 | 3/2005 | Fujii |
| 6,923,355 B2 | 8/2005 | Campagnolo |
| 6,988,739 B2 | 1/2006 | Guderzo et al. |
| 7,121,968 B2 | 10/2006 | Campagnolo |
| 7,159,881 B2 | 1/2007 | Guderzo et al. |
| 7,184,872 B2 | 2/2007 | Guderzo |
| 7,223,189 B2 | 5/2007 | Guderzo et al. |
| 7,292,923 B2 | 11/2007 | Guderzo |
| 7,383,103 B2 | 6/2008 | Guderzo et al. |
| 2001/0027495 A1 | 10/2001 | Campagnolo |
| 2003/0078716 A1 | 4/2003 | Takeda |
| 2003/0160420 A1 | 8/2003 | Fukuda |
| 2004/0051273 A1 | 3/2004 | Fujii |
| 2005/0223840 A1 | 10/2005 | Takamoto |
| 2007/0213908 A1* | 9/2007 | Guderzo et al. ............... 701/51 |
| 2007/0270719 A1 | 11/2007 | Jwo |
| 2008/0312799 A1 | 12/2008 | Miglioranza |
| 2009/0204299 A1 | 8/2009 | Miglioranza |

FOREIGN PATENT DOCUMENTS

| | | |
|---|---|---|
| DE | 3938454 | 11/1989 |
| EP | 0 529 664 A2 | 3/1993 |
| EP | 0 529 664 A3 | 3/1993 |
| EP | 0529664 A2 | 3/1993 |
| EP | 0529664 A3 | 3/1993 |
| EP | 0 605 741 | 7/1994 |
| EP | 0605741 | 7/1994 |
| EP | 1 103 456 A2 | 5/2001 |
| EP | 1 103 456 A3 | 5/2001 |
| EP | 1103456 A2 | 5/2001 |
| EP | 1103456 A3 | 5/2001 |
| EP | 1 238 903 | 9/2002 |
| EP | 1238903 | 9/2002 |
| EP | 1 381 021 | 1/2004 |
| EP | 1381021 | 1/2004 |
| EP | 1 475 302 | 11/2004 |
| EP | 1475302 | 11/2004 |
| EP | 1 500 582 | 1/2005 |
| EP | 1500582 | 1/2005 |
| EP | 1 591 355 | 11/2005 |
| EP | 1591355 | 11/2005 |
| EP | 1 652 769 | 5/2006 |
| EP | 1652769 | 5/2006 |

OTHER PUBLICATIONS

European Search Report, Application No. 08425069.5, dated Jul. 30, 2008.

* cited by examiner

METHOD FOR ELECTRONICALLY CONTROLLING A BICYCLE GEARSHIFT AND ELECTRONIC SYSTEM FOR A BICYCLE

FIELD OF INVENTION

The present description concerns a method for electronically controlling a bicycle gearshift as well as an electronic system for a bicycle.

BACKGROUND

A system for transmitting motion in a bicycle includes a chain extending between toothed wheels associated with the crank axle and associated with the hub of the rear wheel. When there is more than one toothed wheel at at least one of the crank axle and the hub of the rear wheel, a gearshift is provided that includes a chain guide element, also known as derailleur, movable to displace the chain among the toothed wheels in order to change the gear ratio.

In the case of an electronically servo-assisted gearshift, for example in U.S. patent application Ser. No. 12/133,625, the displacement of the derailleur takes place through an electromechanical actuator, typically including an electric motor and an articulated parallelogram system. Control electronics automatically drive the actuator, based upon one or more detected variables such as the travel speed, the cadence of revolution of the cranks, the torque applied to the cranks, the slope of the travel terrain, the heart rate of the cyclist and similar variables, and/or based upon commands manually entered by the cyclist through suitable command members, such as levers or buttons.

SUMMARY

The present description relates to a method for electronically servo-assisting an electronically servo-assisted bicycle gearshift. The method includes the sequential steps of starting displacement of an actuator from a current position to a position of engagement of a chain on an extreme toothed wheel of a gearshift group, preselecting a destination toothed wheel of the gearshift group, and stopping displacement when the actuator is in a position of engagement of the chain on the destination toothed wheel.

The present description also relates to a bicycle electronic system that includes control electronics, and at least one actuator that moves a chain between toothed wheels of a gearshift group. The control electronics have modules adapted to start a displacement the at least one actuator from a current position to a position of engagement of the chain on an extreme toothed wheel of the gearshift group, subsequently preselect a destination toothed wheel of the gearshift group, and subsequently stop the displacement when the actuator is in a position of engagement of the chain on the destination toothed wheel.

DETAILED DESCRIPTION OF THE PREFERRED EMBODIMENTS

Introduction to the Embodiments

Figure 1:
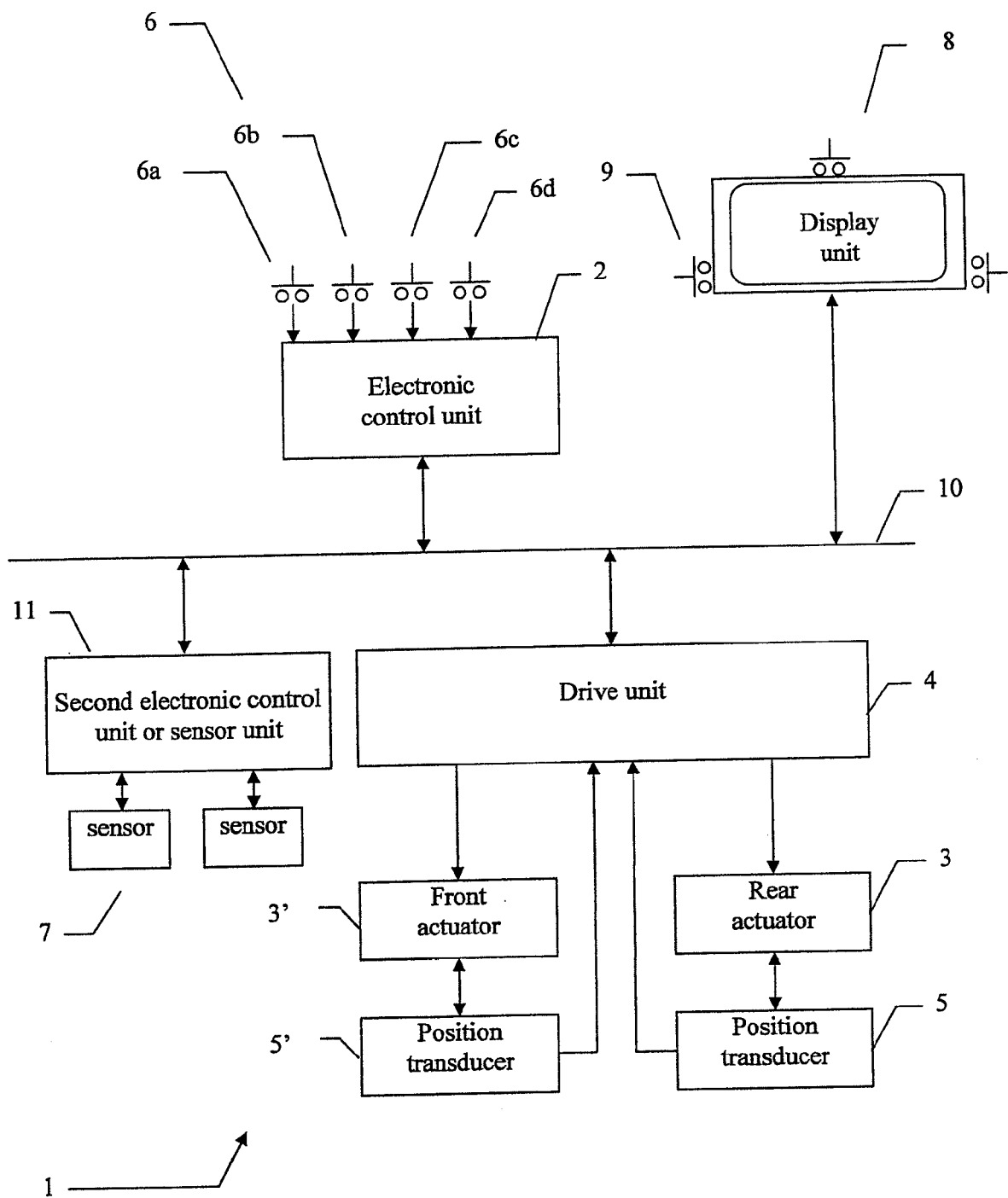
FIG. 1 represents a block diagram of a first embodiment of a bicycle electronic system.

The disclosed method for electronically servo-assisting an electronically servo-assisted bicycle gearshift, comprises the sequential steps of:

a) starting a displacement of an actuator from a current position to a position of engagement of a chain on an extreme toothed wheel of a gearshift group, b) preselecting a destination toothed wheel of the gearshift group, c) stopping the displacement when the actuator is in a position in which the chain engages the destination gearwheel.

In the present description and in the attached claims, "extreme toothed wheel" is defined as the toothed wheel of minimum or maximum diameter, respectively, of the gearshift group.

It should be noted that in step a), the toothed wheel is the extreme toothed wheel irrespective of the toothed wheel of the gearshift group currently engaged by the chain, and therefore not only accidentally, in case the toothed wheel currently engaged by the chain is the one immediately adjacent thereto and gearshifting is in the direction of the extreme toothed wheel.

In other words, it is initially assumed that gearshifting will lead to the maximum or minimum gear ratio, respectively, relative to a gearshift group. Only after shifting has begun it is considered whether to interrupt gearshifting to stop at an intermediate gear ratio, established in step b). It follows from this that the actuation of the gearshift is particularly fast.

Preferably step a) comprises the steps of:

1) setting a destination toothed wheel as extreme toothed wheel of the gearshift group, and 2) starting a displacement of the derailleur from the current position to the position of engagement of the chain on the destination gearwheel.

Preferably, the gearshift group is a rear gearshift group.

Even more preferably, the extreme toothed wheel is the toothed wheel of minimum diameter.

The method can, e.g., be applied to downward gearshifting of the rear gearshift group, in the case of reaching the peak, namely when the cyclist encounters a downhill stretch at the end of a climb, and it is appropriate to change to the maximum gear ratio.

Alternatively, the extreme toothed wheel is the toothed wheel of maximum diameter.

The step a) of starting the displacement can comprise the step of receiving a manual command for requesting the start of gearshifting.

Alternatively or in addition, step a) of starting the displacement can comprise carrying out a first evaluation of at least one travel parameter.

Preferably, the at least one travel parameter is selected from pedaling cadence and torque applied to the cranks.

For example, the evaluation can consist of comparing the travel parameter with a lower threshold and/or an upper threshold.

The step b) of preselecting a destination toothed wheel can comprise receiving a manual command for requesting the end of gearshifting.

Alternatively, or in addition, the step b) of preselecting a destination toothed wheel can comprise carrying out a second evaluation of at least one travel parameter.

Preferably, step b) of preselecting comprises the steps of providing an end of gearshifting request signal, comparing in response to the end of gearshifting request signal the current position of the actuator with positions of the actuator for engagement of the chain with a respective toothed wheel of the gearshift group, and preselecting as the position for engagement on the destination toothed wheel one of the positions of the actuator adjacent to the current position.

In one embodiment, the adjacent theoretical position follows the current position in the direction of the displacement.

In another embodiment, the adjacent theoretical position precedes the current position in the direction of displacement.

In yet another embodiment, the adjacent theoretical position is the adjacent theoretical position closest to the current position, respectively following or preceding in the direction of displacement.

In case the adjacent theoretical position precedes or can precede in the direction of the displacement, the method can further comprise step d) of reversing the direction of displacement of the chain.

The method can further comprise the step of carrying out a different type of gearshifting through the steps of:

e) preselecting a destination toothed wheel of the gearshift group, and f) carrying out a displacement of the actuator from a current position to a position of engagement of the chain on the destination toothed wheel.

Preferably, the method comprises the steps of transmitting signals from at least one electronic control unit, and receiving the signals in a drive unit of the actuator, in the signals an instruction being encoded selected from the group consisting of: an instruction to start gearshifting, an instruction to finish gearshifting, an instruction to complete gearshifting at a specified toothed wheel, an instruction to carry out gearshifting up to a specific toothed wheel, an instruction to move the actuator, and an instruction to stop the actuator.

The steps of transmitting and receiving signals (or data packets) can take place through a wireless communication channel, but they preferably take place through a cable communication channel.

The steps of transmitting and receiving signals or data packets may take place through a half duplex asynchronous serial communication protocol.

The disclosed bicycle electronic system or gearshift comprises:

at least one actuator to move a chain between toothed wheels of a gearshift group, and control electronics having modules adapted to a) start a displacement of the actuator from a current position to a position of engagement of the chain on an extreme toothed wheel of the gearshift group, b) subsequently preselect a destination toothed wheel of the gearshift group, and c) subsequently stop the displacement when the actuator is in a position of engagement of the chain on the destination toothed wheel.

The gearshift group may be a rear gearshift group comprising a plurality of toothed wheels.

The extreme toothed wheel may also be the toothed wheel of minimum diameter.

Alternatively, the extreme toothed wheel is the toothed wheel of maximum diameter.

The electronic system further may comprise at least one transducer of the position of the actuator and/or of the chain.

Typically, the actuator comprises an electric motor coupled with an articulated parallelogram.

The electric motor may be a stepper motor.

Alternatively, other types of motors or actuators well known in the art can be used, for example a rack or worm screw system.

The control electronics may comprise a memory of theoretical positions of the actuator, in which the chain engages with a respective toothed wheel of the gearshift group.

The control electronics may comprise modules adapted to provide an end of gearshifting request signal, compare in response to the end of gearshifting request signal a current position of the actuator with the theoretical positions, and preselect the position of engagement on the destination toothed wheel as one of the theoretical positions adjacent to the current position.

As discussed above, the adjacent theoretical position can be the adjacent theoretical position following the current position in the direction of the displacement; the adjacent theoretical position preceding in the direction of the displacement; or the adjacent theoretical position closest to the current position.

In case the adjacent theoretical position precedes or can precede in the direction of the displacement, the control electronics can further comprise modules adapted to reverse the direction of displacement of the chain.

The control electronics can further comprise modules adapted to carry out a different type of gearshifting through the preselection of a destination toothed wheel of the gearshift group, and the subsequent displacement of the actuator from a current position to a position of engagement of the chain on the destination toothed wheel.

The control electronics may comprise at least one electronic control unit and a drive unit of the actuator, and the electronic system further comprises at least one communication channel between the units.

The communication channel can be of the wireless type, or it may comprise at least one cable communication channel.

Moreover, the units may communicate over the communication channel through a half duplex asynchronous serial communication protocol.

The communication channel may also comprise a first communication channel between the units and at least one signal line between the electronic control unit and the drive unit of the actuator.

The signal line may be suitable for transmitting a signal to request stopping of the actuator.

The signal line can also be suitable for transmitting a signal to request movement of the actuator.

The electronic control unit may comprise modules adapted to transmit signals over the communication channel, and the drive unit comprises modules adapted to receive the signals from the communication channel, in the signals an instruction being encoded, selected from the group consisting of: an instruction to start gearshifting, an instruction to finish gearshifting, an instruction to complete gearshifting at a specified toothed wheel, an instruction to carry out gearshifting up to a specified toothed wheel, an instruction to move the actuator, an instruction to stop the actuator.

The bicycle electronic system can comprise manually actuated members to enter gearshifting commands.

Alternatively, or in addition, the bicycle electronic system can comprise at least one travel parameter sensor, the control electronics comprising modules adapted to manage the gear ratios based upon the outputs of the sensor(s) and/or of the manual commands.

The control electronics may comprise modules adapted to carry out a first evaluation of the outputs of the sensor(s) to establish when to start the displacement of the actuator from the current position to the position of engagement on the extreme toothed wheel of the gearshift group.

The control electronics further may comprise modules adapted to carry out a second evaluation of the outputs of the at least one sensor to preselect the destination toothed wheel of the gearshift group.

The bicycle electronic system can further comprise a display unit.

The display unit can further comprise further manually actuated members for entering further commands into the electronic system.

DETAILED DESCRIPTION

Figure 10:
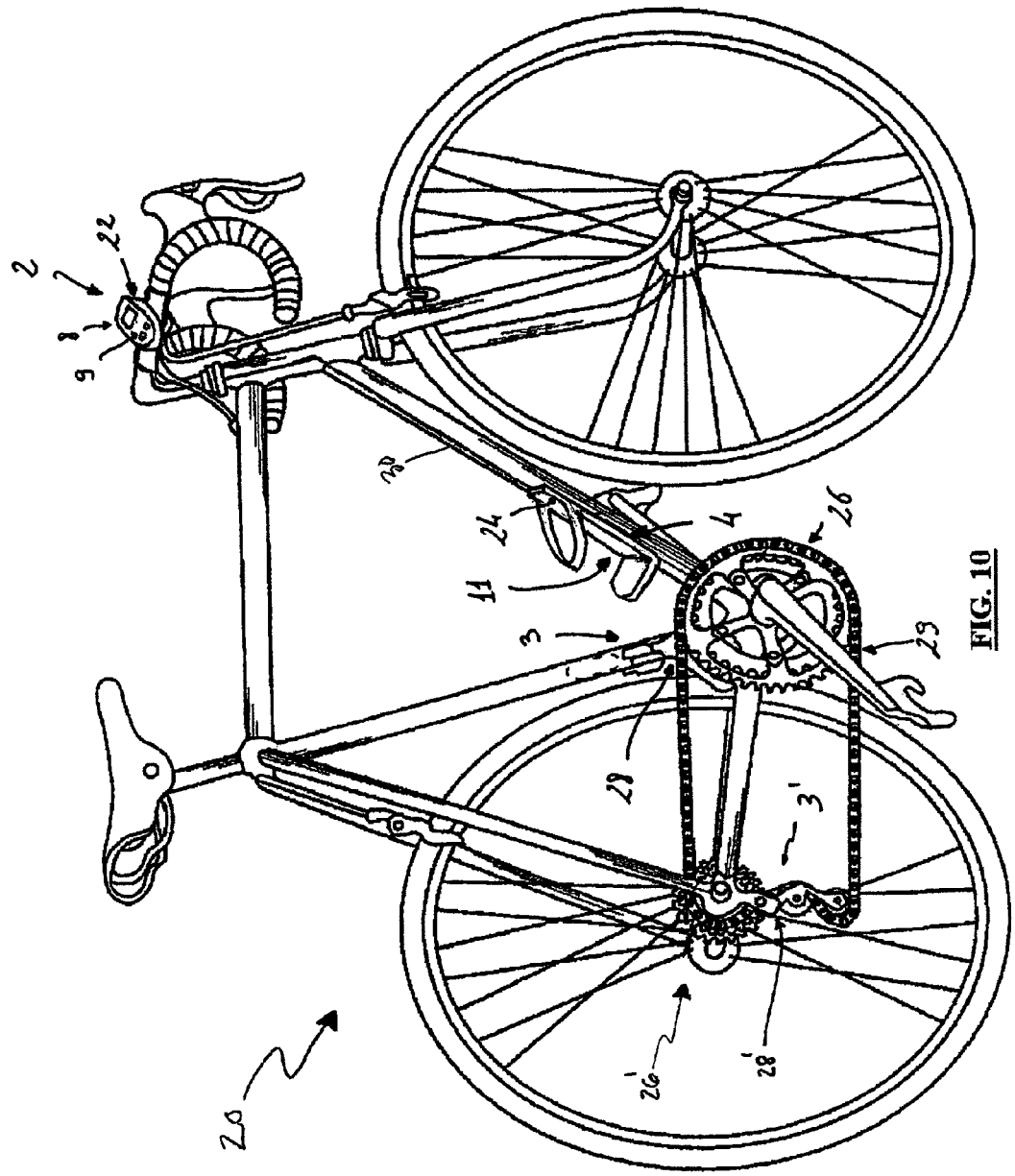
FIG. 10 represents a bicycle including the electronic control unit of FIG. 1.

With reference to FIGS. 1 and 10, a bicycle electronic system 1, according to one embodiment, generally includes an electronic control unit 2, at least one actuator 3, 3' associated with a chain guide element or derailleur 28, 28' intended for the displacement of a motion transmitting chain 29 between toothed wheels 26 associated with the crank axle and/or between toothed wheels 26' associated with the hub of the rear wheel of the bicycle, and a drive unit 4 of the actuator(s) 3, 3'. The servo-assisted bicycle gearshift controlled by the electronic system can, for example, be the type described in U.S. Pat. Nos. 5,480,356, 5,470,277, or European Patent Application No. 1 103 456, all of which are incorporated herein by reference as if fully set forth.

The at least one actuator 3, 3' can comprise an electric motor, preferably of the direct current type, such as a stepper motor, coupled with an articulated parallelogram, but it is possible to use other types of motors or actuators well known in the art, such as a rack or worm screw system, such as the one described in U.S. Pat. No. 6,679,797, incorporated herein by reference as if fully set forth.

The bicycle electronic system 1 preferably further includes at least one position transducer 5, 5' suitable for detecting the position of the actuator 3, 3' and therefore indirectly detecting the position of the derailleur and the chain, or for directly detecting the position of the derailleur, to cooperate with the drive unit 4 and/or the actuator 3, 3' in the displacement of the derailleur.

In the bicycle electronic system 1, when a manual operating mode and/or a semiautomatic operating mode is provided for, the electronic control unit 2 is preferably associated with a plurality of switches, of the normally open type 6a-6d, actuated by the cyclist through manual command members, such as levers or buttons, to enter commands and in particular, manual gearshifting requests.

In particular, in the case of an electronic gearshift equipped both with the front gearshift group and with the rear gearshift group, a pair of switches 6a, 6b are provided, associated with a left command that is grippable by the cyclist and connected to the handlebars for commanding the front derailleur, and a pair of switches 6c, 6d associated with a right command that is grippable by the cyclist and connected to the handlebars for commanding the rear derailleur. Even more specifically, the closing of the switch 6a commands the front derailleur to displace the chain towards toothed wheels having a greater diameter (upward gearshifting), while the closing of the switch 6b commands the front derailleur to displace the chain towards toothed wheels having a smaller diameter (downward gearshifting); the closing of the switch 6c commands the rear derailleur to displace the chain towards toothed wheels having a greater diameter (upward gearshifting), while the closing of the switch 6d commands the derailleur to displace the chain towards toothed wheels having a smaller diameter (downward gearshifting).

The normally open switches 6a-6d can be replaced, mutatis mutandis, by normally closed switches or by commutating switches.

In the bicycle electronic system 1, the electronic control unit 2 is further associated with one or more sensors 7 of travel parameters, such as the travel speed, the cadence of revolution of the cranks, the torque applied to the cranks, the slope of the travel terrain, the heart rate of the cyclist, and similar parameters. The sensors 7 may be of any type commonly known in the art for detecting such travel parameters. When an automatic operating mode and/or a semiautomatic operating mode are provided, the electronic control unit 2 obtains from such sensors 7 a desired gear ratio, and therefore the advisability of carrying out gearshifting. If only manual operation is provided, the sensors 7 can be omitted.

The sensors 7, if provided, are preferably under the control of a second electronic control unit 11, responsible for pre-processing their outputs. Alternatively, the sensors 7 could be under the direct control of the electronic control unit 2, or even under the control of the drive unit 4, or of a display unit 8 preferably included in the bicycle electronic system 1.

The display unit 8, if provided, is used to supply information to the cyclist and/or to enter other parameters and/or commands. Further switches 9 are preferably associated with the display unit 8, and actuated by the cyclist through buttons or a multidirectional button (joystick) for entering the parameters and/or commands, and for selecting the type of data to be displayed, preferably by selecting areas of the display of the display unit 8 in the manner of a graphical user interface. Alternatively, the display unit 8 can be a touch screen. The display unit 8 can comprise its own electronic control unit suitable for managing the information displayed and for managing the communication with the other components of the system, in particular with the electronic control unit 2.

The electronic control unit 2 is preferably positioned near the command members that are actuatable by the cyclist, namely near the handlebars. In particular, the electronic control unit 2 can be housed in a casing 22 fixed to the center of the handlebars. Such a casing can contain the display unit 8, or act as a support for the removable connection of the display unit 8 (FIG. 10).

The drive unit 4 is preferably positioned near the actuators 3, 3', for example in a location near a bottle holder of the bicycle, as shown in FIG. 10.

The sensor unit 11 is preferably also positioned near a bottle-holder of the bicycle, in the same casing 24 of the drive unit or in a separate casing.

The electronic control unit 2 and the drive unit 4 communicate through a communication channel 10.

The communication is preferably conducted via cable 30, but alternatively can be conducted via radio transmission (wireless).

The display unit 8 and the second electronic control unit or sensor unit 11, if provided, also preferably communicate through the same communication channel 10 and the same communication protocol.

More specifically, in the case of a half duplex asynchronous serial communication, the communication channel 10, in practice, includes two common signal lines "Tx/Rx" and "WU," to which the electronic control unit 2 and the drive unit 4, as well as the possible other units 8, 11 are connected, to form a communication network.

The signal line Tx/Rx is a receiving/transmitting line for a bi-directional transmission of data among the various components 2, 4, 8, 11, while the signal line WL is a status line with two values used for the communication protocol. For example, the logic value "0" of the status line NU indicates that the transmission line Tx/Rx is busy, and the logic value "1" of the status line WU indicates that the transmission line Tx/Rx is available for a communication process.

When one of the units 2, 4, 8, 11, or sender, has something to transmit to another of the units 2, 4, 8, 11, or recipient, it checks whether the transmission line, Tx/Rx, is busy or available by reading the value of the status line WU. If the value of the line WU indicates that the transmission line Tx/Rx is busy (WU=0), the sender waits until the value of the line WU indicates that the line Tx/Rx has become available (WU=1). As soon as the transmission line Tx/Rx is available, the sender switches the status of the status line WU, taking it to "0" to occupy the communication network.

The sender then transmits a packet of serial data over the transmission line Tx/Rx.

Each data packet comprises one or more header bytes, depending upon the communication protocol used, and one or more data bytes.

There can also be transmission check data, such as parity or check-sum bits.

The header bytes indicate, e.g., the instructions that must be carried out by the recipient, such information being defined in terms of a code that also encodes the recipient itself, as well as the address of the sender.

The data bytes depend, in length, structure and content, upon which unit 2, 4, 8, 11 is the sender, which unit 2, 4, 8, 11 is the recipient, and the type of information that is transmitted.

When the status line WU is taken to "0" by the sender, the network connected units 2, 4, 8, 11 begin to read the data packet sent by the sender along the transmission line Tx/Rx. The unit 2, 4, 8, 11 that recognizes to be the recipient of the transmission, through the decoding of the header byte(s) of the data packet, becomes the recipient, and can reply by transmitting over the transmission line Tx/Rx, a packet of serial data acknowledging receipt to the current sender. The other network connected units 2, 4, 8, 11, with the exception of the sender and the recipient, are not involved in the transmission process and can perform other activities.

At the end of the transmission from the recipient to the sender, the sender takes the status line WU to "1," thus releasing the communication network. If none of the network connected units 2, 4, 8, 11 reply to the sender, such as in the case of malfunction of the recipient, the sender releases the network after a predetermined time out, taking the status line WU to "1".

The described half duplex asynchronous serial communication is a "random access multi-master communication system," where the exclusive use of the network is carried out by the first "sender" unit 2, 4, 8, 11 that requires the network.

If more than one unit 2, 4, 8, 11 requires the use of the network at a given time, the exclusive use of the network is hierarchically established through a priority system defined by the firmware of the various units 2, 4, 8, 11.

This occurs, for example, when two or more units 2, 4, 8, 11 have something to transmit while the network is busy (status line WU="0"). Under such circumstances, the units must wait until the network becomes available again. At the moment when the network becomes available again (the status line WU is taken to "1"), the two or more units are all ready to occupy the network, but only the unit with the highest hierarchical ranking becomes the sender.

As an alternative to the half duplex asynchronous serial communication described above, between the units 2, 4, 8, 11, a synchronous serial communication, duplex asynchronous serial communication, CAN, Ethernet or similar, could be established, through a suitable communication channel.

Figures 2, 3:
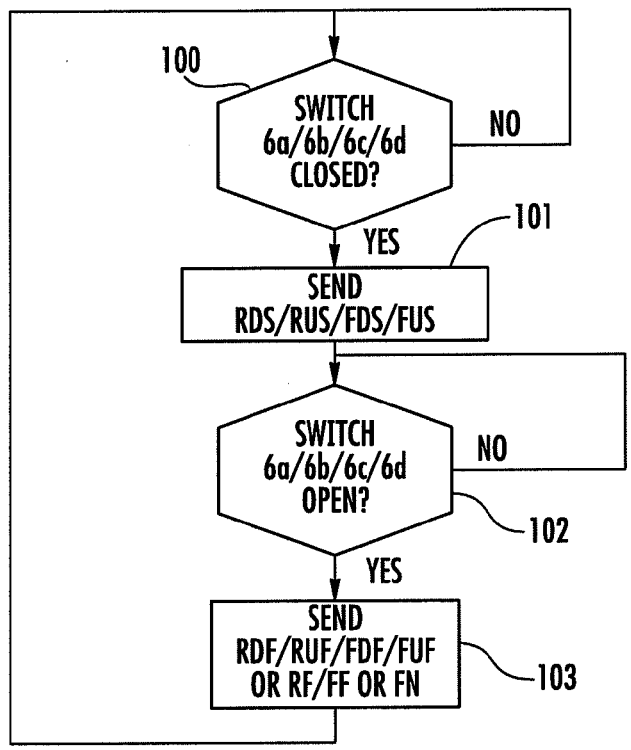
FIG. 2 represents a data structure used in the system of FIG. 1.
FIG. 3 represents a block diagram of the operation of an electronic control unit of the system of FIG. 1, in the case of manual operation or manual operating mode of the gearshift.

FIG. 2 illustrates a data structure, stored in a memory area of the drive unit 4 or in another memory area accessible to it, in which the theoretical positions Pi are stored in the form of a table T, i being an integer between 1 and N, each value of i corresponding to a particular toothed wheel of a rear gearshift group. In the illustrated case of a rear gearshift group containing eleven toothed wheels, the table includes the theoretical positions from P1 to P11.

More specifically, the theoretical position P1 represents the position, in a proper measurement unit, that the actuator 3, 3' or position transducer 5, 5' needs to take in order to place the chain in a physical position of engagement with the smallest toothed wheel of the rear gearshift group, i.e. the one with the smallest diameter; the theoretical position P2 represents the position, in the same measurement unit, that the actuator 3, 3' or the position transducer 5, 5' needs to take in order to place the chain in a physical position of engagement with the second smallest toothed wheel of the rear gearshift group, etc., up to the position PN, which is P11 in the case illustrated, which represents the position, in the same measurement unit, that the actuator 3, 3' or the position transducer 5, 5' must take up in order to place the chain in a physical position of engagement with the largest toothed wheel of the rear gearshift group, i.e. the one with the largest diameter.

Each theoretical position can be expressed as a value that the output of the transducer 5, 5' must take up, or as a value of a drive input of the actuator 3, 3'. For example, when the actuator 3, 3' comprises a stepper motor, each theoretical position can be expressed as the number of steps necessary to reach it, starting from an end of stroke position corresponding to the toothed wheel having the minimum diameter.

In the table of FIG. 2, a field i is also included, having values from 1 to N, in this case from 1 to 11. Nevertheless, it should be understood that in a practical implementation, this field can be omitted should the theoretical positions Pi be stored sorted according to the diameter of the corresponding toothed wheel. The table T can be read, as better described hereinafter, by obtaining a specified value Pi based upon the value of a current index i=1 . . . N. If the values Pi are sorted, it is sufficient to simply look up the $i^{th}$ value in the table T.

In another embodiment, the table T could contain different theoretical positions for upward gearshifting and downward gearshifting, the changes to be made with respect to what is subsequently described being within the skills of a person of ordinary skill in the art.

A table analogous to the one shown in FIG. 2 shall be provided in the case of a front gearshift group containing many toothed wheels.

Another embodiment of a control method that can be implemented in the bicycle electronic system 1 shall be described hereinafter with reference to the block diagrams of FIGS. 3 to 7.

FIG. 3 illustrates the block diagram showing the management of the gearshift by the electronic control unit 2 for a system having exclusively manual operation or a manual operating mode. Thus, in a block 100, it is checked whether one of the switches 6a-6d is in the not normal or actuated state, in particular closed, and namely, whether the cyclist is actuating one of the actuation levers or buttons associated with the gearshift. If the check is positive, the control unit 2 sends over the network (block 101) a signal or data packet corresponding to the actuated switch 6a-6d. Such a signal or data packet is indicated as RDS (Rear Down Start), RUS (Rear Up Start), FDS (Front Down Start), or FUS (Front Up Start), respectively. The data packet RDS/RUS/FDS/FUS includes, in code form, an indication of the recipient, i.e. the drive unit 4, and the instruction "start rear derailleur downward gearshifting"/"start rear derailleur upward gearshifting"/"start front derailleur downward gearshifting"/"start front derailleur upward gearshifting," respectively. Once such a signal has been sent over the network, in the subsequent block 102, it is checked whether the corresponding switch 6a-6d has returned into the normal or unactuated state, in particular open. Specifically, it is checked whether the cyclist has released the actuation lever or button. At the moment the cyclist releases the actuation lever to request a cessation in gearshifting, the corresponding switch 6a-6d switches, which is detected by the electronic control unit 2 (output yes from block 102), which upon detection generates sending (block 103) of another signal or data packet, indicated with RDF (Rear Down Finish), RUF (Rear Up Finish), FDF (Front Down Finish), or FUF (Front Up Finish), respectively. Such a data packet RDF/RUF/FDF/FUF comprises, in code form, the indication of the recipient, i.e. the drive unit 4, as well as the instruction, "finish rear derailleur downward gearshifting"/"finish rear derailleur upward gearshifting"/"finish front derailleur downward gearshifting"/"finish front derailleur upward gearshifting," respectively.

It should be noted that, since each gearshift group cannot be actuated in both the upward and downward directions simultaneously, the provision of four signals as described creates a redundancy control. In other words, the signal sent in block 103 can simply consist of a data packet RF (Rear Finish) or FF (Front Finish), containing the instruction, "finish rear derailleur gearshifting"/"finish front derailleur gearshifting." In an even more simplified version in which a single actuator 3, 3' can be actuated at a time, the signal sent in block 103 can simply consist of a data packet FN (Finish), containing the instruction "finish gearshifting."

The process of checking the state of the various switches 6a-6d of blocks 100 and 102 can be carried out cyclically, or it can be provided with interrupt management for such checks, with a reduction in terms of resources used by the control unit 2.

In any case, until the electronic control unit 2 establishes, in block 100, that gearshifting is necessary, it performs other functions, such as error management, communication with the display unit 8, reading of signals coming from the sensors 7 through the second electronic control unit 11, etc.

The transmission of the data packets of blocks 100 and 102 can optionally be repeated until a data packet acknowledging receipt from the drive unit 4 is received.

Figure 4:
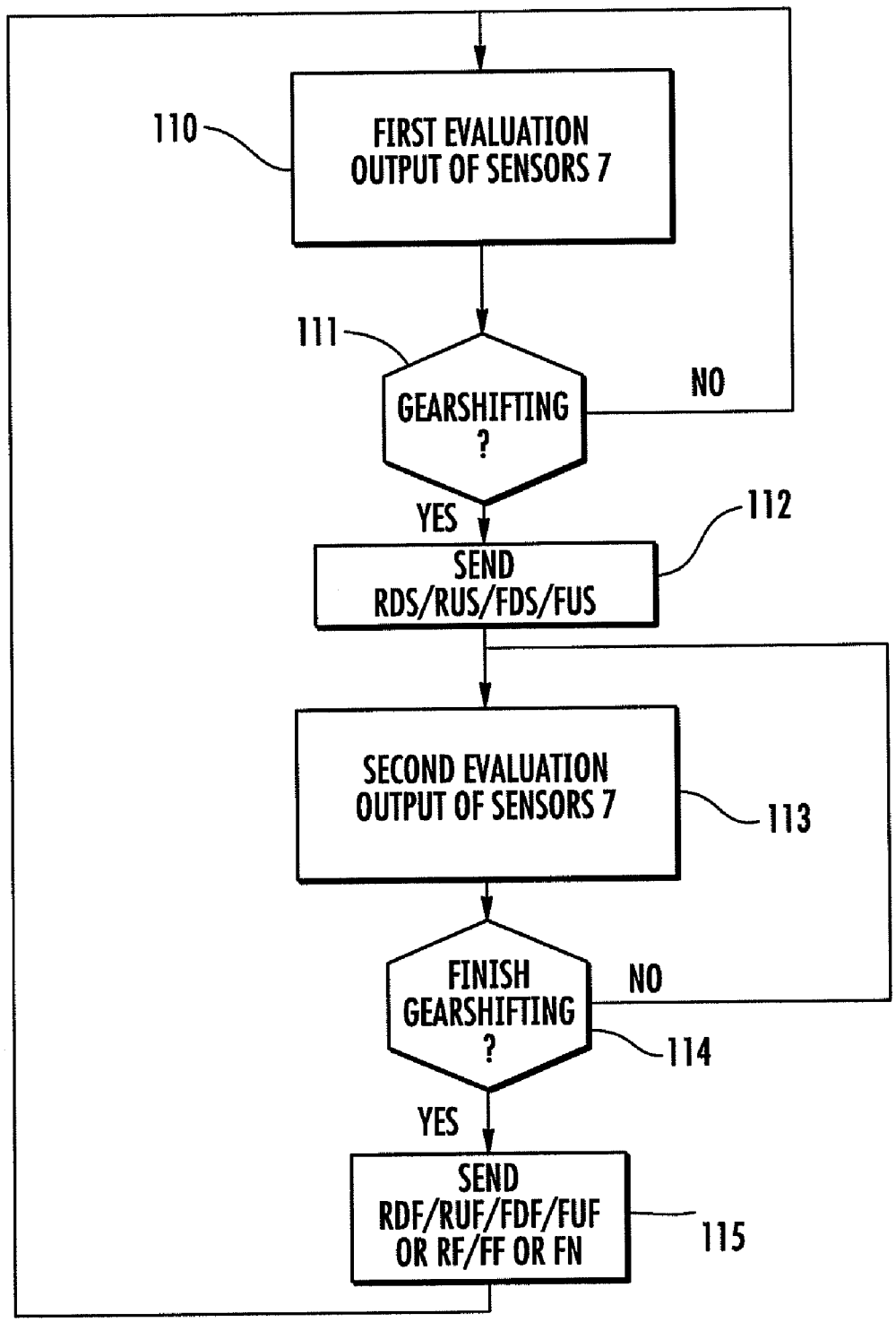
FIGS. 4 and 5 represent block diagrams of the operation of an electronic control unit of the system of FIG. 1, in the case of automatic operation or automatic operating mode of the gearshift, according to two embodiments.

FIG. 4 illustrates a block diagram corresponding to a first embodiment of the management of the gearshift by the electronic control unit 2, in the case of a system having exclusively automatic operation or an automatic operating mode. Thus, in block 110, a first evaluation of the outputs of the sensors 7 is carried out, establishing, in block 111, whether it is suitable or necessary to change. When it is established that it is suitable to change, output yes from block 111, in block 112 a signal is sent over the network corresponding to the type of gearshifting that is suitable, namely one of the data packets RDS/RUS/FDS/FUS described above. In a block 113, a second evaluation of the outputs of the sensors 7 is then carried out, establishing in a block 114 when it is necessary or suitable to end gearshifting. When it has been established that it is suitable to end gearshifting, in a block 115 a corresponding signal is then sent over the network, in other words one of the data packets described above, RDF/RUF/FDF/FUF, or RF/FF, or simply Fi.

Figure 5:
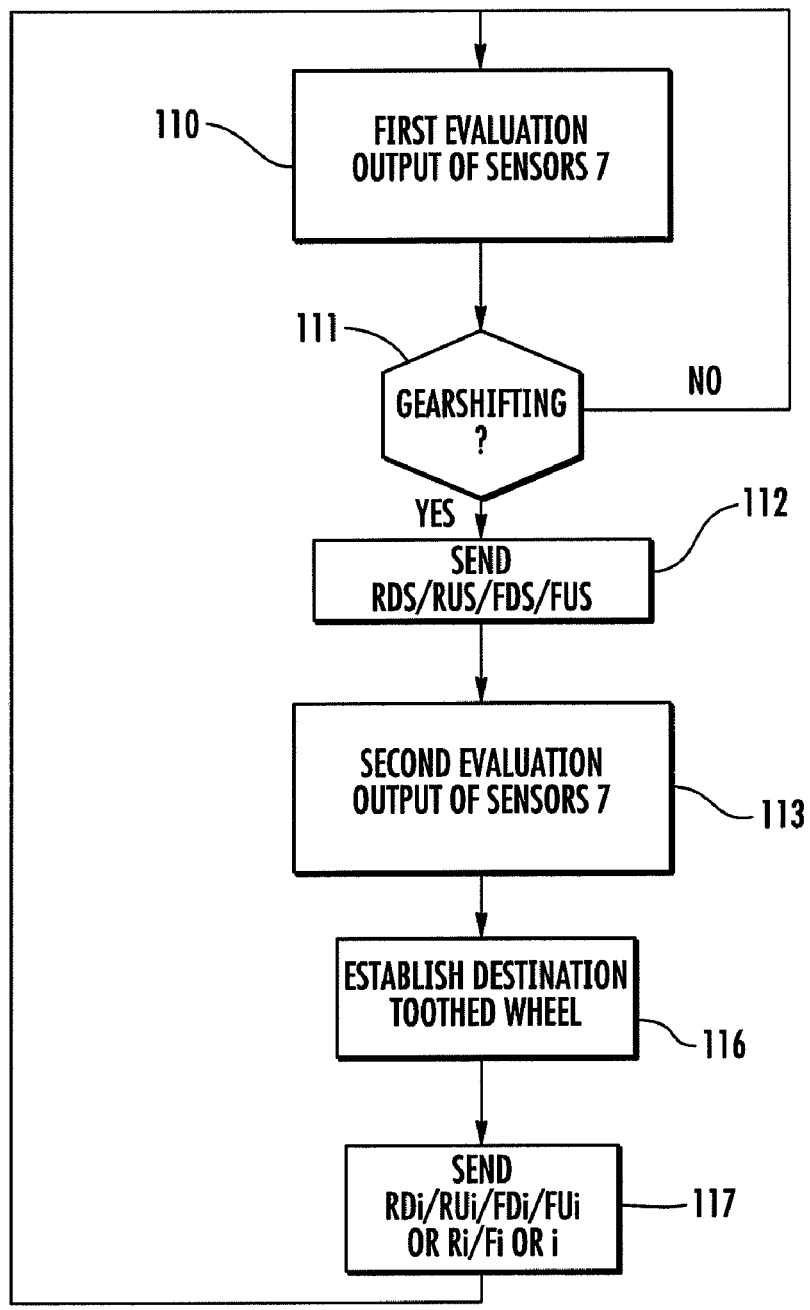

FIG. 5 illustrates a block diagram corresponding to a second embodiment of the management of the gearshift by the electronic control unit 2, in the case of a system having exclusively automatic operation or an automatic operating mode. Also in this embodiment, in block 110 a first evaluation of the outputs of the sensors 7 is carried out, establishing in a block 111 whether it is suitable or necessary to change. When it is established that it is suitable to change, output yes from block 111, in block 112 a corresponding signal is sent over the network, in other words, one of the data packets RDS/RUS/FDS/FUS described above is sent. In block 113, a second evaluation of the outputs of the sensors 7 is then carried out, establishing in a block 116 which is the suitable gear ratio, namely on which toothed wheel it is suitable or necessary for the chain to engage. In subsequent block 117, a corresponding signal is sent over the network. In particular, a data packet that comprises, in code form, an indication of the recipient, i.e. the drive unit 4 and the instruction "complete rear/front derailleur downward/upward gearshifting on the $i^{th}$ toothed wheel". Such a data packet is indicated in FIG. 5 as RDi/RUi/FDi/FUi, if it also indicates the type of gearshifting taking place, for a redundancy control; as Ri/Fi if it indicates, e.g., the gearshift group; and as i if it only indicates the toothed wheel, in the case in which simultaneous gearshifting of the two gearshift groups is inhibited.

In the embodiment of in FIG. 5, the first evaluation of block 110 can be a very fast evaluation, such as checking whether a predetermined travel parameter has crossed a certain threshold. For example, if a pedaling cadence sensor 7 is used and it is desired to keep the cadence constant, if the cadence falls below a lower threshold, an upward gearshifting of the rear gearshift group or a downward gearshifting of the front gearshift group is suitable, while if it rises above an upper threshold, a downward gearshifting of the rear gearshift group or an upward gearshifting of the front gearshift group is suitable. Where a torque sensor 7 is used and it is desired to keep the torque constant, if the torque rises above an upper threshold, an upward gearshifting of the rear gearshift group or a downward gearshifting of the front gearshift group is suitable, while if it falls below a lower threshold, a downward gearshifting of the rear gearshift group or an upward gearshifting of the front gearshift group is suitable. The thresholds can be predetermined values for each toothed wheel, percentage values of an optimal value relative to each toothed wheel or constant differential values applied to each toothed wheel. Furthermore, the first evaluation of block 111 can consist of an evaluation of the change of the output sign of an inclinometer, thus indicative of the sudden passage from a climb to riding downhill or vice-versa, or of the detection of a rapid change in speed, etc.

In such situations, the gearshifting request is forwarded immediately to the drive unit 4, before carrying out the second evaluation of block 113, which can therefore also be computationally complex and therefore slower. This second evaluation can, for example, consist of a quantitative evaluation of the change in pedaling cadence or torque, or of its new value. It can also take many travel parameters into account in the case of numerous sensors 7.

Moreover, the evaluation in two steps can permit evaluating, in block 113, values of the outputs of the sensors 7 that are settled after sudden changes and/or averaged over a short time period, thus improving the evaluation logic itself.

It should be understood that in the case of exclusively semiautomatic operation of the electronic system 1, or in the case of a semiautomatic operating mode, the electronic control unit 2 shall take care of both supervising the actuation of the switches 6 as shown in the block diagram of FIG. 3, and of supervising and evaluating the outputs of the sensors 7, as shown in the block diagram of FIG. 4 or 5, and it shall generate the various signals or packets of bytes described above based upon both. For example, the fulfillment of a manual gearshifting request can be subordinated to checking the travel parameters detected through the sensors 7, or vice-versa, a manual gearshifting request can take priority over evaluation of the travel parameters detected through the sensors 7.

It may be suitable for the electronic control unit 2 to keep the network busy between the sending of the data packet RDS/RUS/FDS/FUS in block 101 or 112, and the sending of the second data packet in block 103, 115 or 117, so as to ensure its immediate availability to send the second data packet. Alternatively, the immediate availability to send the second data packet can be ensured through a high network priority of the electronic control unit 2.

Figure 6:
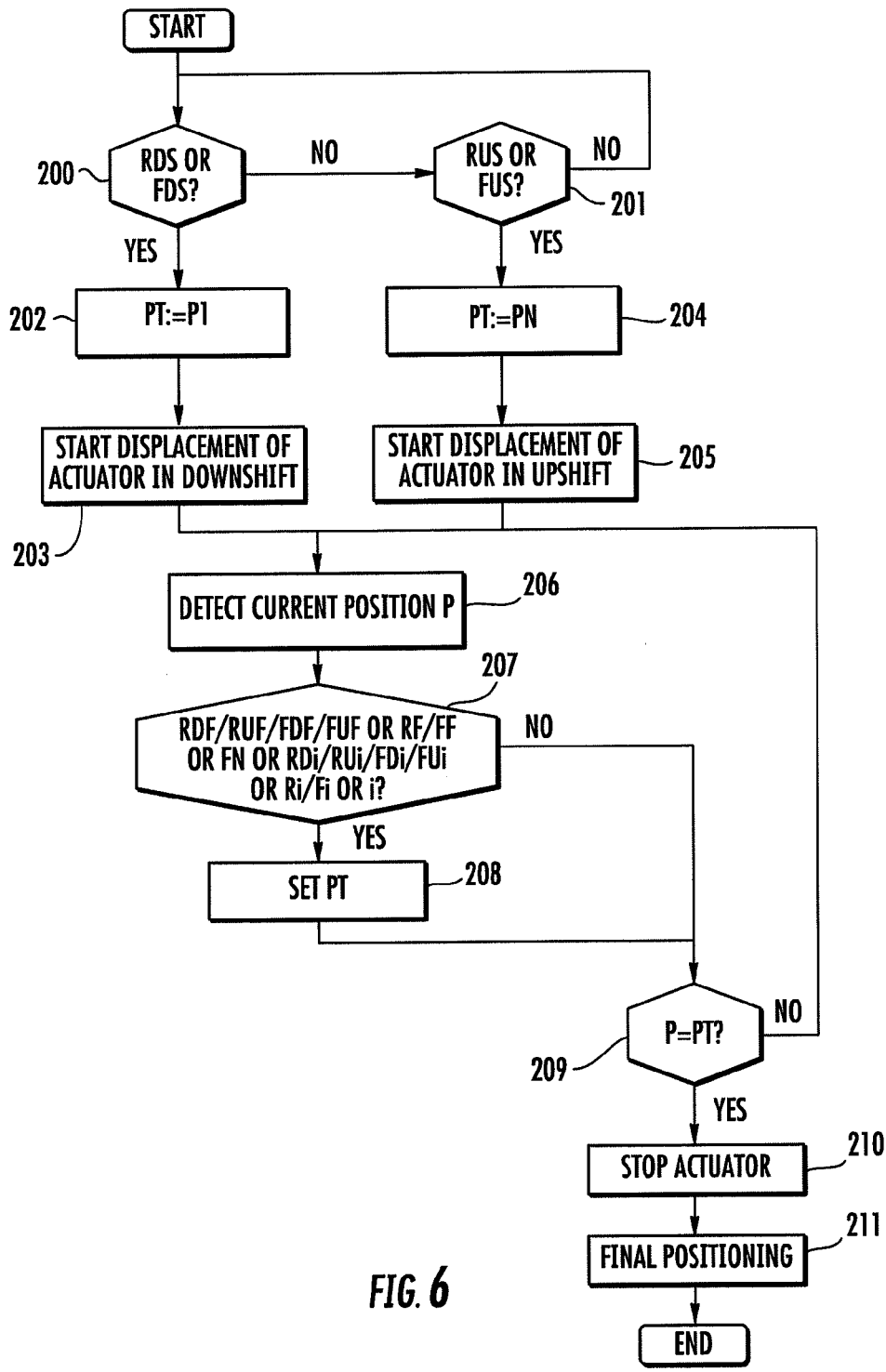
FIGS. 6 and 7 represent block diagrams of the operation of a drive unit of the system of FIG. 1.
Figure 7:
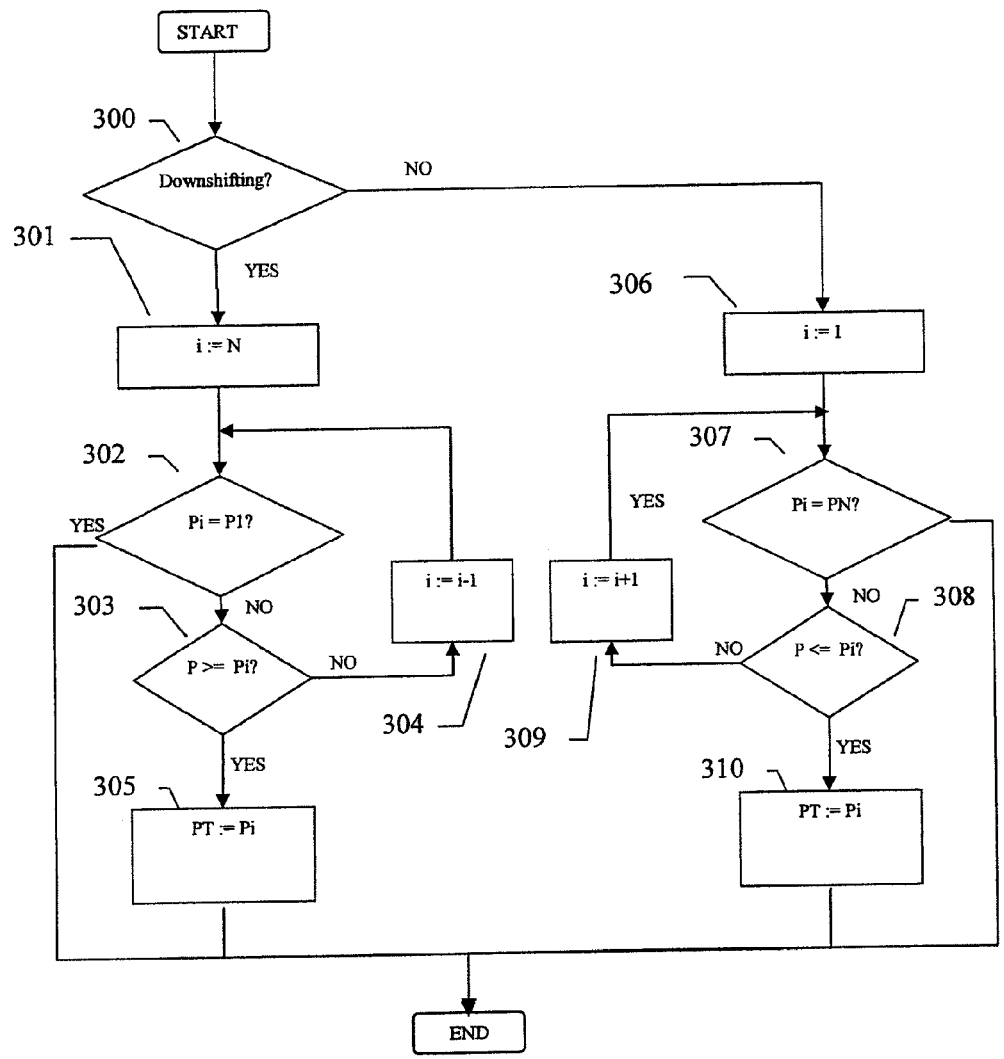

FIGS. 6 and 7 illustrate the block diagram relative to the management of the gearshift by the drive unit 4.

In blocks 200 and 201, the drive unit 4 detects whether a data packet has been detected over the network whose recipient is the drive unit 4 itself, and whether it concerns a gearshifting request, namely whether it is one of the data packets RDS/RUS/FDS/FUS described above.

In the case of a data packet RDS/FDS containing the instruction "start rear/front derailleur downward gearshifting," output yes of block 200, in a block 202 the target or destination position PT is set as the theoretical position of the actuator 3, 3' or of the transducer 5, 5' corresponding to the smallest toothed wheel of the rear/front gearshift group, namely the position P1, as obtained from table T. There can be a check, not shown for the sake of simplicity, to ensure that the chain is not already at the smallest toothed wheel of the rear/front gearshift group, in which case the gearshifting request would be ignored.

In a block 203, which may follow or precede block 202, the actuator 3, 3' is enabled to start displacement of the rear/front derailleur in the downward direction. In other words, unless the current position or starting position is that of the first toothed wheel, the target position is set as P1, irrespectively of the starting toothed wheel, on which the chain is currently engaged.

On the other hand, in the case of the data packet RUS/FUS containing the instruction "carry out rear/front derailleur upward gearshifting," output yes of block 201, in block 204 the target or destination position PT is set as the theoretical position of the actuator 3, 3' or of the transducer 5, 5' corresponding to the largest toothed wheel of the rear/front gearshift group, namely the position PN, as obtained from the table T. There can be a check, not shown for the sake of simplicity, to ensure that the chain is not already at the largest toothed wheel of the rear/front gearshift group, in which case the gearshifting request would be ignored.

In a block 205, which may follow or precede block 204, the actuator 3, 3' is enabled to start displacement of the rear/front derailleur in the upward direction.

In a block 206 following the enabling of the actuator 3, 3' of blocks 203 or 205, the current position of the actuator 3, 3' is detected, through the position transducer 5, 5', if present.

In the next block 207, the drive unit 4 detects whether a signal has been sent over the network indicating the end of gearshifting, namely one of the data packets RDF/RUF/FDF/FUF, whose recipient is the drive unit 4 itself and containing the instruction "finish rear/front derailleur downward/upward gearshifting" or one of its simplified forms RF/FF and FN, or one of the data packets RDi/RUi/FDi/FUi, whose recipient is again the drive unit 4 and containing the instruction "complete rear/front derailleur downward/upward gearshifting on the $i^{th}$ toothed wheel" or one of its simplified forms Ri/Fi or i described above.

When the signal indicating the end of gearshifting is received, output yes from block 207, in a block 208 the target position PT is set.

In the case of automatic operation of the embodiment described with reference to FIG. 5, and therefore of the data packet RDi/RUi/FDi/FUi containing the instruction "complete rear/front derailleur downward/upward gearshifting on the $i^{th}$ toothed wheel" or one of its simplified forms Ri/Fi or i, this shall consist of setting the target position PT at position Pi corresponding to the value i contained in the data packet. In the case of manual operation and in the case of automatic operation of the embodiment described with reference to FIG. 4, the setting takes place according to a mode later described with reference to the block diagram of FIG. 7.

Until a signal indicating the end of gearshifting has been received (output no from block 207), as well as after having selected the target position PT in block 208 upon receipt of the signal indicative of the end of gearshifting, block 209 is carried out, in which it is checked whether the current position P of the actuator 3, 3' or of the transducer 5, 5' corresponds to the target position PT, which corresponds to the position P1 or PN of the extreme toothed wheel set in blocks 202, 204 or to the target position PT set in block 208.

If the check of block 209 has a negative outcome, namely if the target position PT has not yet been reached, block 206 of detecting the current position P is returned to.

When, on the other hand, the evaluation of block 209 has a positive outcome, namely when the target position PT has been reached, in a subsequent block 210, the actuator 3, 3' is disabled. A final adjustment step of the position of the actuator can also be carried out (block 211). Such an adjustment step 211 consists of a displacement of the derailleur, in the same direction or in the opposite direction to that of the displacement started in block 203 or 205, respectively, and ending in block 210, to take the derailleur from the optimal position for the engagement with the destination toothed wheel, namely from the target position PT stored in the table T, to the optimal position for travel in the desired gear ratio. These two positions might not coincide, for example considering the different slope that the chain takes up based upon the toothed wheel of the other gearshift group on which it is currently engaged, for which reason the derailleur could touch the chain itself if it were left in the engagement position, or they may not coincide due to the introduction of an overstroke, as described for example in EP 1 475 302 A1, incorporated herein by reference as if fully set forth.

If the electronic system 1 has no transducers 5, 5', the driving of the actuator 3, 3' can take place simply with the sending of a drive signal that lasts for the amount of time it takes to move the chain between the starting position and the target position PT set initially in blocks 202 and 204, and thereafter in block 208, or by changing the magnitude of a drive signal. In this case, in block 209, it is checked whether the magnitude or duration of the drive signal corresponds to the target position PT.

It should be understood that until the drive unit 4 establishes in blocks 200, 201 that gearshifting is necessary, it performs other functions, such as checking the signals coming from the transducer(s) 5, 5', indicative of possible undesired movements of the actuator 3, 3'.

Moreover, again as an alternative to looped checking of the receipt of the data packets of blocks 200, 201, 207, it is possible to provide for interrupt management of such checks, with a reduction in terms of resources used by the drive unit 4.

In manual operation or automatic operation according to the embodiment described with reference to FIG. 4, the setting of the target position PT of block 208 upon receipt of the data packet RDF/RUF/FDF/FUF containing the instruction to "finish rear/front actuator downward/upward gearshifting," or one of its simplified forms RF/FF and FN is carried out, as shown in FIG. 7, through scanning of the table T of the theoretical positions and making a comparison with the current position P of the actuator 3, 3' or of the transducer 5, 5'.

In a block 300, it is checked whether the gearshifting to be finished is downward gearshifting, for example because the received signal is the data packet RDF or FDF, or based upon the gearshifting start packet received previously.

In the case of downward gearshifting (output yes from block 300), in a block 301, an index i is set at the number N of toothed wheels of the gearshift group, 11 in the case of the table T illustrated in FIG. 2.

Then a cycle is carried out, first comprising the check (block 302) that the index i has not reached the value 1. Until the index i reaches the value 1, in block 303, it is checked whether the current position P of the actuator 3, 3' or of the transducer 5, 5' is greater than or equal to the theoretical position Pi corresponding to the $i^{th}$ toothed wheel, obtained from table T.

Until the comparison of blocks 302 and 303 has a negative outcome, the value of the index i is decreased in block 304.

When, on the other hand, the comparison of block 303 has a positive outcome, the target position PT is set, in block 305, at the theoretical position Pi of the $i^{th}$ toothed wheel, obtained from table T.

Therefore, the target or destination position PT at the end of the setting step of FIG. 7, corresponding to block 208 of FIG. 6, and which is used in block 209 of FIG. 6 to actually end gearshifting, remains that, P1, of the smallest toothed wheel in the case in which the data packet of end of downward gearshifting, for example RDF/FDF, is issued when the derailleur has already reached the smallest toothed wheel of the gearshift group, or in any case it has already passed, during the downward displacement, the penultimate toothed wheel. In the other cases, the target position PT, on the other hand, is replaced by the position of the smaller toothed wheel immediately adjacent to the current position of the derailleur, actually interrupting the displacement of the derailleur towards the smallest toothed wheel of the gearshift group immediately after the cyclist has released the actuation lever or button or, respectively, immediately after the issue of the signal to finish gearshifting by the electronic control unit 2.

If, on the other hand, in block 300, it is checked that the gearshift to be finished is not a downward gearshift (output NO from block 300), and therefore it is an upward gearshifting, in block 306, the index i is set at 1.

Then a cycle is carried out, first comprising the checking (block 307) that the index i has not reached the number N of toothed wheels of the gearshift group, 11 in the case of the table T illustrated in FIG. 2. Until the index i has reached the value N, in block 308 it is checked whether the current position P of the actuator 3, 3' or of the transducer 5, 5' is less than or equal to the theoretical position Pi corresponding to the $i^{th}$ toothed wheel, obtained from table T.

Until the comparison of the blocks 307 and 308 has a negative outcome, the value of the index i is increased in block 309.

When, on the other hand, the comparison of block 308 has a positive outcome, the target position PT is set, in block 310, at the theoretical position Pi of the $i^{th}$ toothed wheel, obtained from table T.

Therefore, the target or destination position PT at the end of the setting step of FIG. 7, corresponding to block 208 of FIG. 6, and that is used in block 209 of FIG. 6 to actually end gearshifting, remains that, PN, of the largest toothed wheel in the case in which the data packet to end upward gearshifting, for example RUF/FUF, is issued when the derailleur has already reached the largest toothed wheel of the gearshift group, or in any case it has already passed, during the upward displacement, the penultimate toothed wheel. In the other cases, the target position PT is, on the other hand, replaced by the position of the larger toothed wheel immediately adjacent to the current position of the derailleur, actually interrupting the displacement of the derailleur towards the largest toothed wheel of the gearshift group immediately after the cyclist has released the actuation lever or button or, respectively, immediately after the issue of the signal to finish the gearshifting by the electronic control unit 2.

In one embodiment, the current position P of the actuator can be obtained only once at the start of the setting step 208, for example at the level of block 301 or 306 respectively, and stored in an auxiliary variable, preferably stored in a register of the drive unit 4, then referring to the value of the auxiliary variable each time the comparison of block 303 or 308 respectively is carried out.

Moreover, another auxiliary variable can be used, also preferably stored in a register of the drive unit 4, into which the value of the theoretical position Pi is loaded, obtained from the table T, each time the value of the index i is updated. The comparisons of block 303 or 308, respectively thus take place between the contents of the two registers.

In another embodiment, in the case of downward gearshifting, instead of setting the target position PT as the position of the smaller toothed wheel immediately adjacent to the current position P, it is possible to set it, in block 305, at the position P(i+1) of the larger toothed wheel immediately adjacent to the current position P. Analogously, in upward gearshifting it is possible to set the target position PT, in block 310, as the position of the smaller toothed wheel P(i−1) immediately adjacent to the current position P. In these cases, in block 209 of FIG. 6 it shall also be checked that the target position PT has not been exceeded, and after having immediately stopped the actuator in block 210 of FIG. 6, one shall proceed to move it in the opposite direction (upward or downward direction respectively) until the target position PT has been reached, unless the difference between the current position P and the target position PT is sufficiently small so that the chain can in any case engage the desired toothed wheel.

In a further embodiment, in the case of downward gearshifting, it is possible to set the target position PT as the theoretical position Pi or P(i+1) of the toothed wheel closest to the current position P. For example, this can be obtained by carrying out the comparison of block 303 between the current position P and the halfway position between the two adjacent theoretical positions, [Pi+P(i−1)]/2. Furthermore, by carrying out the comparison between the current position P and an intermediate position, but not halfway between the two adjacent theoretical positions, it is possible to set the target position as that of the larger toothed wheel immediately adjacent to the current position P of the derailleur only if it is estimated that the chain is still engaged with such a toothed wheel and/or has not yet engaged the smaller toothed wheel immediately adjacent to the current position P of the derailleur. It should be considered that the positioning of the derailleur at the theoretical position does not necessarily correspond to an actual immediate disengagement of the chain from the starting toothed wheel, or respective to an actual immediate engagement of the chain with the destination toothed wheel. To obtain the engagement/disengagement, it is also necessary for a rotation of the toothed wheel to intervene, sufficient to take a tooth, and typically a suitably configured special tooth, at the chain. Analogously, in the case of upward gearshifting, it is possible to set the target position PT as the theoretical position of the toothed wheel closest to the current position P, for example by carrying out the comparison between the current position P and the position halfway between the two adjacent theoretical positions, [Pi+P(i+1)]/2, or it is possible to carry out the comparison between the current position P and an intermediate position, but not halfway between the two adjacent theoretical positions.

Of course, the index i could also vary between 0 and N−1 or between other suitable values in case this makes it easier to accede to the memory locations where the table T is stored.

Moreover, the scanning of the table T could take place in the opposite direction, mutatis mutandis.

It is worthwhile highlighting that the gearshift globally carried out according to the operation described above can be a single or multiple gearshift.

Figure 8:
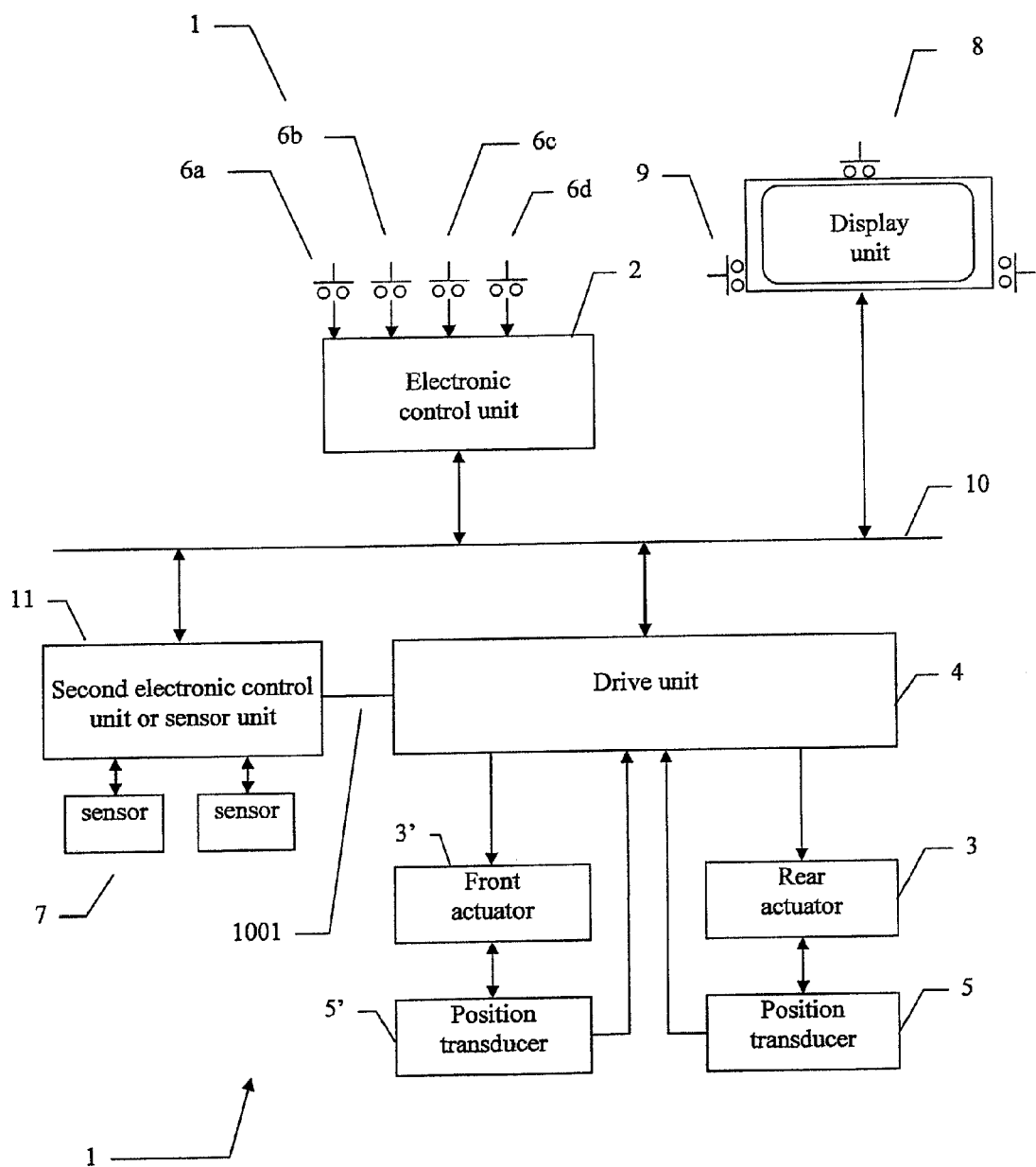
FIG. 8 represents a block diagram of a second embodiment of a bicycle electronic system.

FIG. 8 illustrates a bicycle electronic system 1 that differs from that of FIG. 1 only in that it further provides a dedicated line 1001 between the second electronic control unit 11 and the drive unit 4.

According to this embodiment, the data packet RDS/RUS/FDS/FUS containing the instruction to "start rear/front derailleur downward/upward gearshifting" sent from the electronic control unit 2 to the drive unit 4 in block 101 of FIG. 3 or in block 112 of FIG. 4, is read and decoded also by the second control unit 11. When the second control unit 11 reads the data packet RDS/RUS/FDS/FUS, it generates a command signal M (Move) on the dedicated line 1001, for example by applying a high level of voltage corresponding to a first logic signal. The data packet RDF/RUF/FDF/FUF containing the instruction to "finish rear/front derailleur downward/upward gearshifting," or one of its simplified forms RF/FF and FN, sent by the electronic control unit 2 in block 103 of FIG. 3 or in block 115 of FIG. 4, is on the other hand sent not to the drive unit 4, rather to the second control unit 11. In other words, the data packet shall contain the control unit 11 as recipient. When the second control unit 11 receives the data packet, it generates a second command signal S (Stop) on the dedicated line 1001, for example it applies a low level of voltage corresponding to a second logic signal S.

Figure 9:
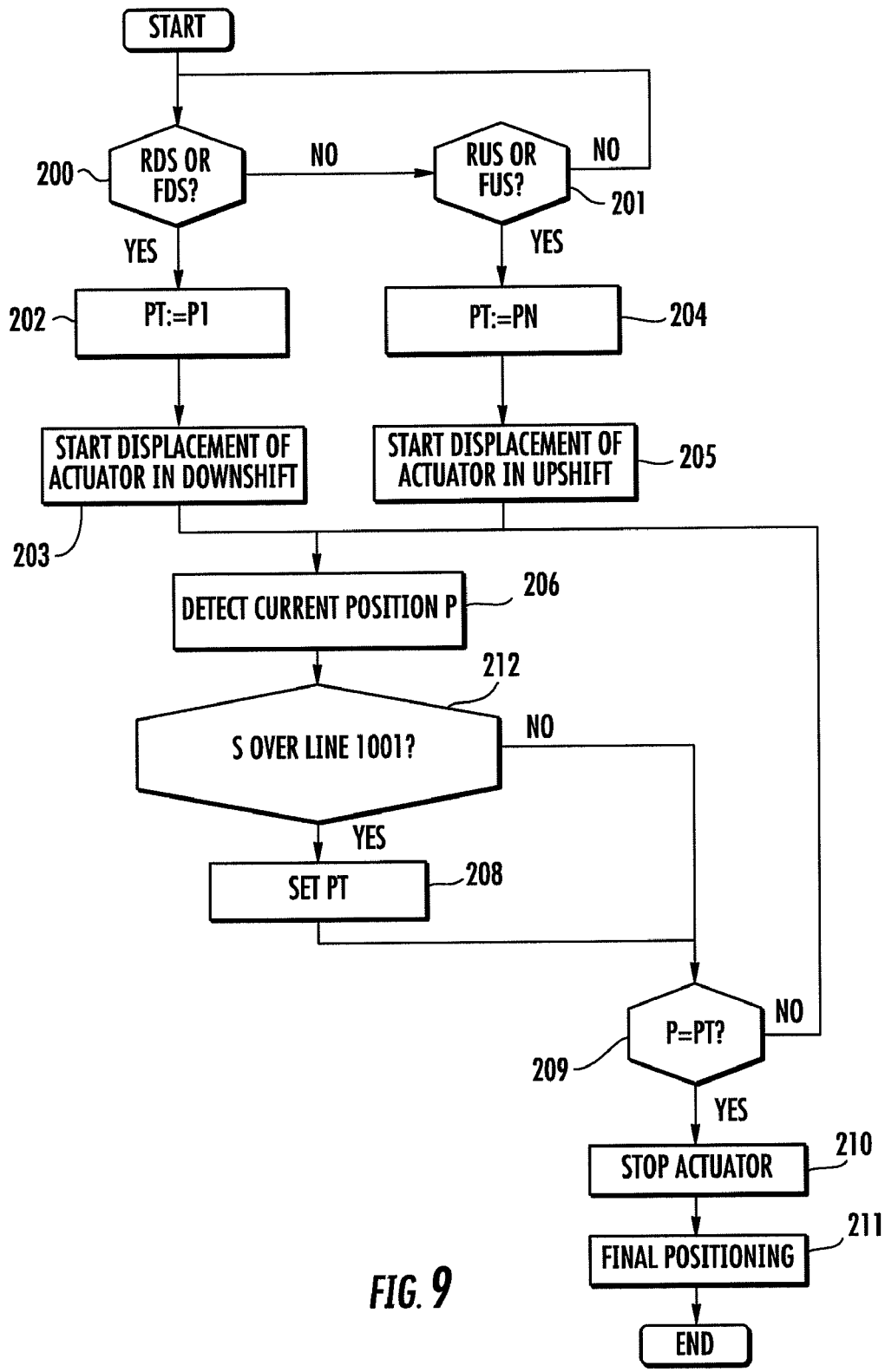
FIG. 9 represents a block diagram of the operation of a drive unit of the system of FIG. 8.

The drive unit 4, to stop gearshifting, does not deal with controlling the commands over the network 10 and decoding them, but instead limits itself to checking the status of the command signal of the dedicated line 1001. In other words, as illustrated in FIG. 9, the block 207 of FIG. 6, of checking whether over the network the signal to finish gearshifting has been sent, is replaced by block 212 of checking whether the second command signal S is present on the dedicated line 1001. As in the case of FIG. 6, until the second command signal S is received, the displacement of the actuator continues through block 209, while as soon as the second command signal S is received, block 208 of setting the target position PT is carried out.

In this embodiment, the decoding of the data packet indicative of the end of gearshifting is carried out by the second control unit 11. This allows electronic components (microcontroller) having lower performance capabilities and which are less expensive to be used for the drive unit 4 or, the components being the same, allows resources of the drive unit 4 to be freed up, so that can be used for other operations.

In a further embodiment, the decoding of the first data packet RDS/RUS/FDS/FUS, containing the instruction to "start rear/front derailleur downward/upward gearshifting," can also be carried out by the second control unit 11, the drive unit only concerning itself with checking the status of a respective dedicated line.

The dedicated line 1001 can be replaced by one, two, three or four dedicated lines, each intended for one of the four different types of gearshifting, rear upward, rear downward, front upward, front downward, by a line dedicated to the front gearshift group and a line dedicated to the rear gearshift group, or by a line dedicated to upward gearshifting and a line dedicated to downward gearshifting.

The previous description has referred to the management of gearshifting with the start of the displacement of the actuator 3, 3' from the current position to the theoretical position corresponding to the extreme toothed wheel of the gearshift group, and possible stopping of such displacement at an intermediate toothed wheel, in all four types of gearshifting.

It should nevertheless be understood that the same principle can be used only for certain types of gearshifting, for example only in the case of downward gearshifting or only in the case of downward gearshifting of the rear gearshift group, in view of the benefits that can be obtained in the case of sudden increases in speed such as in the case of reaching the peak.

For each of the four types of gearshifting, rear upward, rear downward, front upward, front downward, it is also possible to provide both a management of gearshifting with starting of the displacement of the actuator to the theoretical position corresponding to the extreme toothed wheel and possible stopping of such displacement at an intermediate toothed wheel, as well as management of gearshifting with direct starting of the displacement of the derailleur to the theoretical position of a specified, typically but not necessarily adjacent, toothed wheel.

To obtain this second type of gearshifting, a single data packet is transmitted, containing the instruction "carry out rear/front derailleur upward/downward gearshifting" for single gearshift, or "carry out rear/front derailleur upward/downward gearshifting up to the $i^{th}$ toothed wheel" for single or multiple gearshifting. In this case, the drive unit 4, in block 202 or 204 of FIG. 6 or 9, shall set the target position PT as the theoretical position corresponding to the toothed wheel immediately adjacent to the current one, with a greater or smaller diameter, respectively, in the case of upward or downward gearshifting, respectively, or as the theoretical position Pi corresponding to the ith toothed wheel, as obtained from the table T, and it will skip block 207 or 212, respectively, of waiting for the second signal and block 208 of setting the target position PT.

If only manual operation is provided for, the sensors 7 and the second electronic control unit 11 can be omitted.

As stated, not all of the electronic control units 2, 4, 8, 11 of the bicycle electronic system 1 are necessarily present. The aforementioned functions can therefore be centralized in fewer units or even in a single unit. In the case of a single unit, the communication network 10 shall be omitted.

What is claimed is:

1. A method for electronically servo-assisting an electronically servo-assisted bicycle gearshift, comprising the sequential steps of:
   a) starting a displacement of an actuator from a current position to a position of engagement of a chain on an extreme toothed wheel of a gearshift group,
   b) preselecting a destination toothed wheel of the gearshift group,
   c) stopping the displacement when the actuator is in a position of engagement of the chain on the destination toothed wheel,
   wherein the step b) of preselecting a destination toothed wheel comprises the steps of providing an end of gearshifting request signal, comparing in response to the end of gearshifting request signal the current position of the actuator with positions of the actuator for engagement of the chain with a respective toothed wheel of the gearshift group, and preselecting as the position for engagement on the destination toothed wheel one of the positions of the actuator adjacent to the current position.

2. The method of claim 1 wherein the gearshift group is a rear gearshift group.

3. The method of claim 2 wherein the extreme toothed wheel is the toothed wheel of minimum diameter.

4. The method according to claim 2 wherein the extreme toothed wheel is the toothed wheel of maximum diameter.

5. The method of claim 1 wherein the step a) of starting the displacement comprises the step of receiving a manual command for requesting the start of gearshifting.

6. The method of claim 1 wherein the step a) of starting the displacement comprises carrying out a first evaluation of at least one travel parameter.

7. The method of claim 6 wherein the at least one travel parameter is selected from a pedaling cadence and a torque applied to at least one crank.

8. The method of claim 1, wherein the step b) of preselecting a destination toothed wheel comprises receiving a manual command for requesting the end of gearshifting.

9. The method of claim 1 wherein the step b) of preselecting a destination toothed wheel comprises carrying out a second evaluation of at least one travel parameter.

10. The method of claim 1 wherein the position of engagement follows the current position in the direction of the displacement.

11. The method of claim 1 wherein the position of engagement precedes the current position in the direction of the displacement.

12. The method of claim 1 wherein the position of engagement is the position closest to the current position, following or preceding, respectively, in the direction of the displacement.

13. The method of claim 11, further comprising a step d) of reversing the direction of displacement.

14. The method of claim 12, further comprising a step d) of reversing the direction of displacement.

15. The method of claim 1, further comprising the step of carrying out a different type of gearshifting through the steps of:
   e) preselecting a destination toothed wheel of the gearshift group, and
   f) carrying out a displacement of the actuator from a current position to a position of engagement of the chain on the destination toothed wheel.

16. A method for electronically servo-assisting an electronically servo-assisted bicycle gearshift, comprising the sequential steps of:
   a) starting a displacement of an actuator from a current position to a position of engagement of a chain on an extreme toothed wheel of a gearshift group,
   b) preselecting a destination toothed wheel of the gearshift group,
   c) stopping the displacement when the actuator is in a position of engagement of the chain on the destination toothed wheel, and
   further comprising the steps of transmitting signals from at least one electronic control unit, and receiving the signals in a drive unit of the actuator an instruction being encoded selected from a group consisting of: an instruction to start gearshifting, an instruction to finish gearshifting, an instruction to complete gearshifting at a specified toothed wheel, an instruction to carry out gearshifting up to a specified toothed wheel, an instruction to move the actuator, and an instruction to stop the actuator.

17. A bicycle electronic system, comprising:
   at least one actuator that moves a chain between toothed wheels of a gearshift group, and
   control electronics having modules adapted to
     a) start a displacement of the at least one actuator from a current position to a position of engagement of the chain on an extreme toothed wheel of the gearshift group,
     b) subsequently preselect a destination toothed wheel of the gearshift group, and
     c) subsequently stop the displacement when the actuator is in a position (PT) of engagement of the chain on the destination toothed wheel,
   wherein the control electronics comprise a memory of theoretical positions of the actuator, of engagement of the chain with a respective toothed wheel of the gearshift group.

18. The electronic system of claim 17 wherein the gearshift group is a rear gearshift group comprising a plurality of toothed wheels.

19. The electronic system of claim 18 wherein the extreme toothed wheel is the toothed wheel of minimum diameter.

20. The electronic system of claim 18 wherein the extreme toothed wheel is the toothed wheel of maximum diameter.

21. The electronic system of claim 17 further comprising at least one transducer of the position of the actuator and/or of the chain.

22. The electronic system of claim 17 wherein the control electronics comprise modules adapted to provide an end of gearshifting request signal, compare in response to the end of gearshifting request signal a current position of the actuator with the theoretical positions, and preselect the position of engagement on the destination toothed wheel as one of the theoretical positions adjacent to the current position.

23. The electronic system of claim 17 wherein the control electronics further comprise modules adapted to reverse the direction of displacement.

24. The electronic system of claim 17, wherein the control electronics further comprise modules adapted to carry out a different type of gearshifting through the preselection of a destination toothed wheel of the gearshift group, and the subsequent displacement of the actuator from a current position to a position of engagement of the chain on the destination toothed wheel.

25. The electronic system of claim 17 wherein the control electronics comprise at least one electronic control unit and a drive unit of the actuator, and the electronic system further comprises at least one communication channel between the units.

26. The electronic system of claim 25 wherein the at least one communication channel comprises a first communication channel between the units and at least one signal line between the electronic control unit and the drive unit of the actuator.

27. The electronic system of claim 26 wherein the at least one signal line is suitable for transmitting a signal to request stopping of the actuator.

28. The electronic system of claim 17 comprising manually actuated members to enter gearshifting commands.

29. The electronic system of claim 17 comprising at least one travel parameter sensor, the control electronics comprising modules adapted to manage gear ratios based upon outputs of the at least one travel parameter sensor and/or of manual commands.

30. The electronic system of claim 29 wherein the control electronics comprises modules adapted to carry out a first evaluation of the outputs of the at least one travel parameter sensor to establish when to start the displacement of the actuator from the current position to the position of engagement on the extreme toothed wheel of the gearshift group.

31. The electronic system of claim 29 wherein the control electronics further comprise modules adapted to carry out a second evaluation of the outputs of the at least one travel parameter sensor to preselect the destination toothed wheel of the gearshift group.

32. A bicycle electronic system, comprising:
at least one actuator that moves a chain between toothed wheels of a gearshift group, and
control electronics having modules adapted to:
  a) start a displacement of the at least one actuator from a current position to a position of engagement of the chain on an extreme toothed wheel of the gearshift group,
  b) subsequently preselect a destination toothed wheel of the gearshift group, and
  c) subsequently stop the displacement when the actuator is in a position of engagement of the chain on the destination toothed wheel,
wherein the control electronics comprise at least one electronic control unit and a drive unit of the actuator, and the electronic system further comprises at least one communication channel between the units,
wherein the at least one electronic control unit comprises modules adapted to transmit signals over the at least one communication channel, and the drive unit comprises modules adapted to receive the signals from the at least one communication channel that are encoded with at least one instruction selected from a group consisting of: an instruction to start gearshifting, an instruction to finish gearshifting, an instruction to complete gearshifting at a specified toothed wheel, an instruction to carry out gearshifting up to a specified toothed wheel, an instruction to move the actuator, an instruction to stop the actuator.

* * * * *

UNITED STATES PATENT AND TRADEMARK OFFICE
CERTIFICATE OF CORRECTION

| | | |
|---|---|---|
| PATENT NO. | : 8,249,782 B2 | Page 1 of 1 |
| APPLICATION NO. | : 12/366364 | |
| DATED | : August 21, 2012 | |
| INVENTOR(S) | : Federico Miglioranza | |

It is certified that error appears in the above-identified patent and that said Letters Patent is hereby corrected as shown below:

ON THE TITLE PAGE
On Page 2, in item (56), under "FOREIGN PATENT DOCUMENTS"

At Column 1, Line 1, delete "DE 3938454 11/1989".

At Column 2, Line 2, delete "EP 0529664 A2 3/1993".

At Column 2, Line 3, delete "EP 0529664 A3 3/1993".

At Column 2, Line 5, delete "EP 0605741 7/1994".

At Column 2, Line 8, delete "EP 1103456 A2 5/2001".

At Column 2, Line 9, delete "EP 1103456 A3 5/2001".

At Column 2, Line 11, delete "EP 1238903 9/2002".

At Column 2, Line 13, delete "EP 1381021 1/2004".

At Column 2, Line 15, delete "EP 1475302 11/2004".

At Column 2, Line 17, delete "EP 1500582 1/2005".

At Column 2, Line 19, delete "EP 1591355 11/2005".

At Column 2, Line 21, delete "EP 1652769 5/2005".

At Column 7, Line 14, after the word "line", delete "WL" and insert therefor --WU--.

At Column 7, Line 16, after the word "line", delete "NU" and insert therefor --WU--.

At Column 10, Line 31, after the word "the", delete "$^{t}i$ h" and insert therefor --$^{t}i^{h}$ --.

Signed and Sealed this
Nineteenth Day of February, 2013

Teresa Stanek Rea
*Acting Director of the United States Patent and Trademark Office*